US008861419B2

(12) United States Patent
Korus et al.

(10) Patent No.: US 8,861,419 B2
(45) Date of Patent: Oct. 14, 2014

(54) METHODS FOR BINDING AND UNBINDING A MBMS BEARER TO A COMMUNICATION GROUP IN A 3GPP COMPLIANT SYSTEM

(75) Inventors: Michael F. Korus, Eden Prairie, MN (US); Peter M. Drozt, Prairie Grove, IL (US); Michelle M. Antonelli, Barrington, IL (US); Donald G. Newberg, Hoffman Estates, IL (US); Valentin Oprescu-Surcobe, Northbrook, IL (US); Aparna Pandey, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 395 days.

(21) Appl. No.: 12/981,274

(22) Filed: Dec. 29, 2010

(65) Prior Publication Data

US 2012/0170502 A1 Jul. 5, 2012

(51) Int. Cl.
*H04H 20/71* (2008.01)
*H04W 4/00* (2009.01)
*H04W 72/00* (2009.01)
*H04L 29/06* (2006.01)
*H04W 4/06* (2009.01)
*H04W 76/00* (2009.01)

(52) U.S. Cl.
CPC .............. *H04W 4/06* (2013.01); *H04W 76/002* (2013.01); *H04W 72/005* (2013.01); *H04L 65/4076* (2013.01)
USPC .......................................... 370/312; 370/329

(58) Field of Classification Search
None
See application file for complete search history.

(56) References Cited

U.S. PATENT DOCUMENTS

| 6,775,242 | B2 | 8/2004 | Grilli et al. |
| 7,096,013 | B1 | 8/2006 | Randai et al. |
| 7,738,423 | B2 | 6/2010 | Khan |
| 7,768,914 | B2 | 8/2010 | Pauwels |
| 7,924,723 | B2 | 4/2011 | Johnson et al. |
| 7,995,510 | B2 | 8/2011 | Gao |
| 8,085,783 | B2 | 12/2011 | Zhou et al. |

(Continued)

FOREIGN PATENT DOCUMENTS

| CN | 101325791 A | 12/2008 |
| EP | 1581014 A1 | 9/2005 |

(Continued)

OTHER PUBLICATIONS

Open Mobile Alliance Standard "OMA-TS-PoC_MULTICAST_PoC-V2.1-20091222-C"; December 22, 2009; Sections 6 and 7; p. 23-27.
3GPP TS 26.346 V.9.4.0; "3rd Generation Partnership Project; Technical Specification Group Services and System Aspects; Multimedia Broadcast/Multicast Service (MBMS); Protocols and Codecs, Release 9"; Sections 5.4.1 and 8; Sep. 2010.

(Continued)

*Primary Examiner* — Jutai Kao
(74) *Attorney, Agent, or Firm* — Steven A. May

(57) ABSTRACT

A 3GPP compliant system includes a radio access network (RAN) partitioned into a plurality MBMS services areas, wherein each MBMS service area has a plurality of MBMS bearers established a priori for transporting media streams. An infrastructure device: receives a request to transmit a media stream to a communication group, wherein the request to transmit is received after the MBMS bearers were established; determines a MBMS bearer in a MBMS service area to assign to transport the media stream; generates a MBMS connect message that binds the communication group to the assigned MBMS bearer, wherein the MBMS connect message includes an identifier for the communication group and an identifier for the assigned MBMS bearer; and sends the MBMS connect message to members of the communication group.

12 Claims, 7 Drawing Sheets

(56) References Cited

U.S. PATENT DOCUMENTS

| | | | |
|---|---|---|---|
| 8,098,590 B2 | 1/2012 | Catovic et al. | |
| 8,135,418 B2 | 3/2012 | Ranganathan et al. | |
| 8,175,069 B2 | 5/2012 | Wang et al. | |
| 8,576,763 B2 | 11/2013 | Gonsa et al. | |
| 2003/0148779 A1 | 8/2003 | Aravamudan et al. | |
| 2003/0211859 A1 | 11/2003 | Chen et al. | |
| 2005/0227718 A1 | 10/2005 | Harris et al. | |
| 2005/0235289 A1 | 10/2005 | Barillari et al. | |
| 2005/0260997 A1 | 11/2005 | Korale et al. | |
| 2006/0034202 A1 | 2/2006 | Kuure et al. | |
| 2007/0133527 A1 | 6/2007 | Kuure et al. | |
| 2007/0153727 A1 | 7/2007 | McBeath et al. | |
| 2007/0264992 A1 | 11/2007 | Maenpaa | |
| 2007/0281722 A1 | 12/2007 | Gao | |
| 2008/0102811 A1 | 5/2008 | Amirjoo et al. | |
| 2008/0212583 A1 | 9/2008 | Rey et al. | |
| 2008/0267109 A1 | 10/2008 | Wang et al. | |
| 2008/0293428 A1 | 11/2008 | Rey et al. | |
| 2008/0311892 A1* | 12/2008 | Lee et al. | 455/414.1 |
| 2009/0080363 A1 | 3/2009 | Song et al. | |
| 2009/0080451 A1 | 3/2009 | Gogic | |
| 2009/0103466 A1 | 4/2009 | Gu et al. | |
| 2009/0113487 A1* | 4/2009 | Nanjunda Swamy | 725/62 |
| 2009/0207773 A1 | 8/2009 | Feng et al. | |
| 2009/0245155 A1 | 10/2009 | Fukunaga et al. | |
| 2009/0303909 A1 | 12/2009 | Farhoudi et al. | |
| 2009/0323638 A1 | 12/2009 | Catovic et al. | |
| 2010/0027541 A1* | 2/2010 | Eriksson et al. | 370/390 |
| 2010/0061308 A1 | 3/2010 | Becker et al. | |
| 2010/0081451 A1 | 4/2010 | Mueck et al. | |
| 2010/0128649 A1* | 5/2010 | Gonsa et al. | 370/312 |
| 2010/0128722 A1 | 5/2010 | Madour et al. | |
| 2010/0157969 A1 | 6/2010 | Swamy et al. | |
| 2010/0222055 A1 | 9/2010 | Cho et al. | |
| 2010/0232340 A1 | 9/2010 | Godor et al. | |
| 2010/0265867 A1 | 10/2010 | Becker et al. | |
| 2010/0302988 A1* | 12/2010 | Becker | 370/312 |
| 2010/0332610 A1 | 12/2010 | Cherian et al. | |
| 2011/0077006 A1 | 3/2011 | Hsu | |
| 2011/0128903 A1 | 6/2011 | Futaki et al. | |
| 2011/0145846 A1 | 6/2011 | Kim | |
| 2011/0149879 A1 | 6/2011 | Noriega et al. | |
| 2011/0151885 A1 | 6/2011 | Buyukkoc et al. | |
| 2011/0159880 A1 | 6/2011 | Kumar et al. | |
| 2011/0305183 A1 | 12/2011 | Hsu et al. | |
| 2011/0305184 A1 | 12/2011 | Hsu | |
| 2012/0008525 A1 | 1/2012 | Koskinen | |
| 2012/0014264 A1 | 1/2012 | Wang | |
| 2012/0033623 A1* | 2/2012 | Chu et al. | 370/329 |
| 2012/0044907 A1 | 2/2012 | Mildh | |
| 2012/0170501 A1 | 7/2012 | Drozt et al. | |
| 2012/0172028 A1 | 7/2012 | Korus et al. | |
| 2012/0230240 A1 | 9/2012 | Nebat et al. | |
| 2012/0236776 A1 | 9/2012 | Zhang et al. | |
| 2013/0064160 A1 | 3/2013 | Newberg et al. | |
| 2013/0301509 A1 | 11/2013 | Purnadi et al. | |
| 2014/0177436 A1 | 6/2014 | Korus et al. | |
| 2014/0177437 A1 | 6/2014 | Korus et al. | |

FOREIGN PATENT DOCUMENTS

| | | | |
|---|---|---|---|
| WO | 02089501 A1 | 11/2002 | |
| WO | 03098871 A1 | 11/2003 | |
| WO | 2006027006 A1 | 3/2006 | |
| WO | 2008123824 A2 | 10/2008 | |
| WO | 2011000947 A1 | 1/2011 | |
| WO | 2011068421 A1 | 6/2011 | |

OTHER PUBLICATIONS

3GPP TS 23.246 V.9.5.0; 3rd Generation Partnership Project; Technical Specification Group Services and System Aspects; Multimedia Broadcast/Multicast Service (MBMS); Architecture and Functional Description, Release 9; Sections 4.4.3, 4.4.4, and 8; Jun. 2010.

3GPP TSG RAN WG3 #59bis; "E-MBS Functions of Statistical Multiplexing"; R2-074339; Oct. 8-12, 2007; Shanghai, China; 8 Pages.

International Search Report and Written Opinion for related counterpart International Patent Application No. PCT/US2011/067354 mailed on Mar. 21, 2012.

International Search Report and Written Opinion for related counterpart International Patent Application No. PCT/US2011/066709 mailed on Jul. 6, 2012.

International Search Report and Written Opinion for related counterpart International Patent Application No. PCT/US20112/053051 mailed on Nov. 26, 2012.

Non Final Office Action mailed Oct. 26, 2012 in related U.S. Appl. No. 12/981,226, filed Dec. 29, 2010.

Non Final Office Action mailed Oct. 26, 2012 in related U.S. Appl. No. 12/981,323, filed Dec. 29, 2010.

International Search Report and Written Opinion for related counterpart International Patent Application No. PCT/US2011/066705 mailed on Jan. 18, 2013.

3rd Generation Partnership Project (3GPP), "3GPP TS 26.246 V9.0.0: Technical Specification Group Services and System Aspects; Transparent end-to-end packet switched streaming service (PSS); 3GPP SMIL Language Profile (Release 9)," 3GPP Standard, pp. 1-17, Dec. 10, 2009.

Open Mobile Alliance: "Poc User Plane Approved Version 1.0.3," OMA-TS-PoC__UserPlane-V1_0_3-20090922-A, pp. 1-12, Sep. 22, 2009.

Open Mobile Alliance: "OMA PoC Control Plane Approved Version 1.0.3," OMA-TS-PoC__ControlPlane-V1_0_3-20090922-A, pp. 1-8, Sep. 22, 2009.

Rosenberg, J. et al., "SIP: Session Initiation Protocol," RFC 3261, Network Working Group Request for Comments, pp. 14, Jun. 1, 2002.

"Multimedia Broadcast and Multicast Services in 3G Mobile Netowrks," Alcatel Telecommunications Revenues, pp. 1-12, Apr. 1, 2004.

Alexiou, A. et al., "MBMS Multicast Mode of UMTS," Retrieved from the Internet URL: http://ru6.cti.gr/ru6/publications/2148HCNDS2007_MBMS_Bouras.pdf on Jul. 21, 2014, pp. 1-33.

Ericsson et al., "MBMS Interest Indication for connected UEs," 3GPP Draft, R2-116190, 3rd Generation Partnership Project (3GPP), Mobile Competence Centre, vol. RAN WG2, No. San Francisco, USA, pp. 20111110-20111114, Nov. 8, 2011.

Final Office Action mailed Apr. 15, 2013 in U.S. Appl. No. 12/981,226, filed Dec. 29, 2010.

Final Office Action mailed Apr. 25, 2013 in U.S. Appl. No. 12/981,323, Michael F. Korus, filed Dec. 29, 2010.

Hallahan, R. and Peha, J.M., "Policies for Public Safety Use of Commercial Wireless Networks," 38th Telecommunications Policy Reasearch Conference, Retrieved from the Internet URL: http://users.ece.cmu.edu/~peha/public_safety_priority_access.pdf on Jul. 21, 2014, pp. 1-34.

Hartung, F. et al., "MBMS—IP Multicast/Broadcast in 3G Networks," International Journal of Digital Multimedia Broadcasting, vol. 2009, (2009) Article ID 597848, pp. 1-25.

Huawei, "Stage 2 agreements on service continuity and location information for MBMS for LTE," 3GPP Draft, R2-115596, 3rd Generation Partnership Project (3GPP), Mobile Competence Centre, vol. RAN WG2, No. Zhuhai; 20111010, Oct. 26, 2011.

International Search Report for counterpart International Patent Application No. PCT/US2013/071828 mailed on May 13, 2014.

International Search Report for counterpart International Patent Application No. PCT/US2013/071837 mailed on May 13, 2014.

Non-Final Office Action mailed Apr. 17, 2014 in U.S. Appl. No. 13/231,530, Donald G. Newberg et al., filed Sep. 13, 2011.

Non-Final Office Action mailed Jun. 4, 2014 in U.S. Appl. No. 12/981,323, filed Dec. 29, 2010.

Notice of Allowance mailed May 21, 2014 in U.S. Appl. No. 13/724,098, Michael F. Korus et al., filed Dec. 21, 2012.

Qualcomm Europe, "Qualcomm proposal for E-UTRAN Architecture and Protocols," 3GPP Draft, R2-052921, 3rd Generation Partnership Project (3GPP), Mobile Competence Centre, vol. RAN WG2, No. Seoul, Korea; 20051102, Nov. 2, 2005.

* cited by examiner

| 602 | 604 | 606 |
|---|---|---|
| TMGI # | IP MULTICAST ADDR | GROUP ID |

*FIG. 6*

| 702 | 704 | 706 |
|---|---|---|
| TMGI #1 | IP MULTICAST ADDR#1 | TG ASSIGNMENT |
| TMGI #2 | IP MULTICAST ADDR#2 | TG ASSIGNMENT |
| ... | ... | ... |
| TMGI #n | IP MULTICAST ADDR#n | TG ASSIGNMENT |

*FIG. 7*

METHODS FOR BINDING AND UNBINDING A MBMS BEARER TO A COMMUNICATION GROUP IN A 3GPP COMPLIANT SYSTEM

REFERENCE TO RELATED APPLICATIONS

The present application is related to the following U.S. applications commonly owned together with this application by Motorola, Inc.:

Ser. No. 12/981,323, filed Dec. 29, 2010, titled "Methods for Assigning a Plethora of Group Communications Among a Limited Number of Pre-Established MBMS Bearers in a Communication System" by Korus; and Ser. No. 12/981,226, filed Dec. 29, 2010, titled "Methods for Transporting a Plurality of Media Streams over a Shared MBMS Bearer in a 3GPP Compliant Communication System" by Drozt.

TECHNICAL FIELD

The technical field relates generally to communication systems and more particularly to methods for binding and unbinding a Multimedia Broadcast/Multicast Service (MBMS) bearer to a communication group in a $3^{rd}$ Generation Partnership Project (3GPP) compliant system.

BACKGROUND

Long Term Evolution (LTE) is a radio technology designed to increase the capacity and speed of mobile telephone networks and provides for an end-to-end Internet Protocol (IP) service delivery of media. Currently, LTE comprises a set of enhancements to the Universal Mobile Telecommunications System (UMTS), which is described in a suite of Technical Specifications (TS) developed within and publicized by $3^{rd}$ Generation Partnership Project (3GPP), with the most recent version of the 3GPP TSs being published in September 2010.

LTE, in part, provides for a flat IP-based network architecture designed to ensure support for, and mobility between, some legacy or non-3GPP systems such as, for instance, GPRS (general packet radio service) and WiMAX (Worldwide Interoperability for Microwave Access). Some of the main advantages with LTE are high throughput, low latency, plug and play, FDD (frequency-division duplex) and TDD (time-division duplex) in the same platform, improved end user experience, simple architecture resulting in low operating costs, and interoperability with older standard wireless technologies such as GSM (Global Systems for Mobile Communications), cdmaOne™, W-CDMA (UMTS), and CDMA2000®. Many major carriers in the United States (US) and several worldwide carriers have started to convert their networks to LTE.

LTE and other 3GPP compliant systems (meaning systems having elements that operate in compliance with 3GPP TSs) also provide MBMS point-to-multipoint transport of media to UE operating on the system. Unfortunately, the MBMS transport mechanisms that are described in the 3GPP TSs have many shortcomings when compared to point-to-multipoint transport mechanisms offered by legacy narrowband systems. However, if organizations having more stringent requirements for media transport are going to realistically be able to use 3GPP technology, systems such as LTE systems will need to provide similar performance as the legacy systems, including similar performance for the point-to-multipoint mechanisms.

Accordingly, what is needed are some enhancements to the MBMS mechanisms of 3GPP compliant systems.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 6 illustrates a message used for binding and unbinding a MBMS bearer to a communication group in accordance with some embodiments.

FIG. 7 illustrates a message used for binding and unbinding a MBMS bearer to a communication group in accordance with some embodiments.

Figure 1:
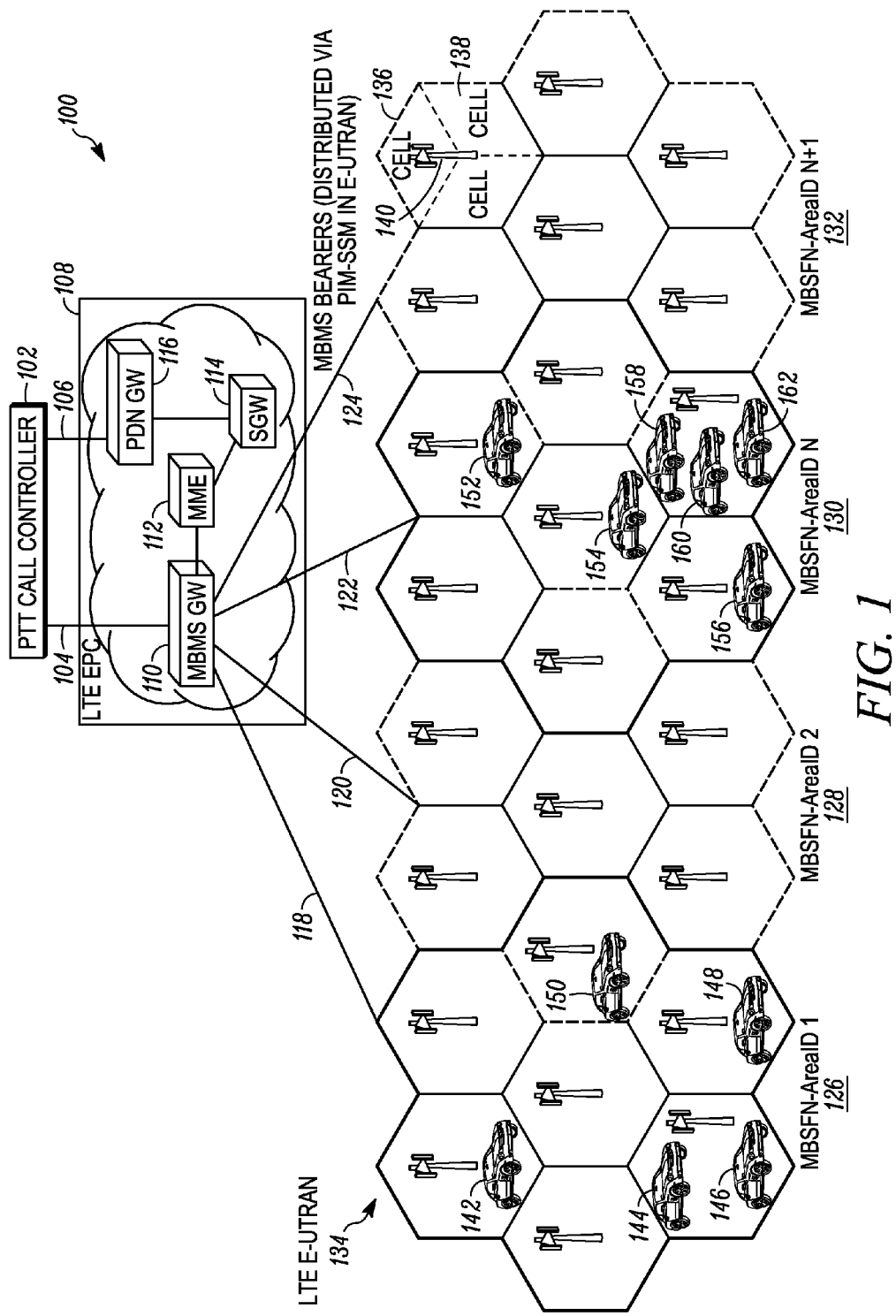
FIG. 1 is a system diagram of a 3GPP compliant communication system that implements methods for allocating MBMS bearers in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented, where appropriate, by conventional symbols in the drawings, showing only those specific details that are pertinent to understanding the various embodiments so as not to obscure the disclosure with details that will be readily apparent to those of ordinary skill in the art, having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to an embodiment, an infrastructure device coupled to a 3GPP compliant system performs a method to allocate MBMS bearers. The 3GPP compliant system includes a radio access network (RAN) partitioned into a plurality MBMS services areas, wherein each MBMS service area has a plurality of MBMS bearers established a priori for transporting media streams. The infrastructure device: receives a request to transmit a media stream to a communication group, wherein the request to transmit is received after the MBMS bearers were established; determines a MBMS bearer in a MBMS service area to assign to transport the media stream; generates a MBMS connect message that binds the communication group to the assigned MBMS bearer, wherein the MBMS connect message includes an identifier for the communication group and an identifier for the assigned MBMS bearer; and sends the MBMS connect message to members of the communication group.

Pursuant to a further embodiment of the present disclosure, an infrastructure device: receives a location message from a user equipment (UE) that identifies a MBMS service area in which the UE is currently located; sends a response message to the UE, wherein the response message includes a listing of identifiers for the MBMS bearers that are already established in the MBMS service area in which the UE is currently located; and sends a second message that indicates a current communication group assignment status for each of the MBMS bearers in the listing, wherein the second message is smaller in size that the response message.

Referring now to the drawings, and in particular FIG. 1, a communication system in accordance with some embodiments is shown and indicated generally at 100. System 100 includes system elements of: an infrastructure device 102 such as an application server (that is illustrated as a Push-to-Talk (PTT) Controller); and an LTE Evolved Packet Core (EPC) 108 (having a Mobility Management Entity (MME) 112, a MBMS Gateway (MBMS GW) 110, a Serving Gateway (SGW) 114, and a Packet Data Network Gateway (PDN GW) 116 with other elements of an LTE EPC not included for ease of illustration such as a Broadcast Multicast Service Center (BM-SC) which could be located within the EPC or alternatively within the application server. System 100 further includes elements of: an access network (in this case an LTE Evolved Universal Terrestrial Radio Access Network (E-UTRAN)) 134 that includes a plurality of eNodeB (LTE base station) infrastructure devices (with one labeled as 140); and a plurality of UE 142, 144, 146, 148, 150, 152, 154, 156, 158, 160, 162. In general, the EPC and the E-UTRAN are referred to collectively as the LTE system. The elements of communication system 100 and the interfaces between them are further described below.

The E-UTRAN 134 elements, EPC 108 elements, PTT call controller 102, and UE 142 to 162 implement protocols and signaling in compliance with 3GPP TSs (including, but not limited to, 3GPP TSs 26.346 and 23.246, which describe aspects of 3GPP MBMS); and the terms LTE communication system, LTE system, and Evolved Packet System (EPS) are used interchangeably herein and are each defined as being inclusive of the E-UTRAN 134 and the EPC 108 but not inclusive of the PTT call controller 102 or the UE. Moreover, only a limited number of EPC elements and UE, and one PTT call controller and E-UTRAN are shown in the diagram, but more such elements may be included in an actual system implementation. Also, the E-UTRAN can be any type of access network, including any 3G, e.g., UMTS, or 4G e.g. WiMAX, access network, or WiFi.

In general, the UE, the PTT call controller 102, the EPC 108 logical elements, and the E-UTRAN 134 elements are each implemented using (although not shown) a memory, one or more network interfaces, and a processing device that are operatively coupled, and which when programmed form the means for these system elements to implement their desired functionality, for example as illustrated by reference to the methods and diagrams shown in FIGS. 2-8. The network interfaces are used for passing signaling, also referred to herein as messaging, (e.g., messages, packets, datagrams, frames, superframes, and the like) between the elements of the system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

The processing device utilized by the UE, the PTT call controller 102, the EPC 108 logical elements, and the E-UTRAN 134 elements may be programmed with software or firmware logic or code for performing functionality described by reference to FIGS. 2 to 8; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

We now turn to a brief description of the functionality of the system elements shown in FIG. 1, which will aid in the understanding of the later description of the methods and signaling diagrams illustrated by reference to FIGS. 2 to 8. The UE 142, 144, 146, 148, 150, 152, 154, 156, 158, 160, 162, are also referred to in the art as subscribers, communication devices, access devices, access terminals, mobile stations, mobile subscriber units, mobile devices, user devices, and the like. Although illustratively shown in FIG. 1 as a device used in a vehicle, the UE can be any type of communication device such as radios, mobile phones, mobile data terminals, Personal Digital Assistants (PDAs), laptops, two-way radios, cell phones, and any other device capable of operating in a wired or wireless environment and that can be used by a user in the system.

Infrastructure device 102 is an intermediary device that facilitates transport of media (e.g., voice, data, video, etc.) from one or more source applications to one or more destination devices (such as members affiliated with a communication group, such as a talkgroup) over the LTE system. As such, the application server may be, for instance, a computer aided dispatch (CAD) server, a media server, a call controller, etc. In one illustrative embodiment, infrastructure device 102 is an application server in a packet data network providing application layer services to UE connected to the E-UTRAN 134 that are authorized and have the capabilities to use these services. In this instance infrastructure device 102 is a PTT call controller providing PTT services to the UE. Other services may include, for example, PTV (Push-to-Video) services, PTX (Push-to-anything) services, etc.

In one illustrative embodiment, the PTT call controller 102 communicates with the UE using control signaling described in OMA-TS-PoC_ControlPlane-V1_0_3-20090922-A and OMA_TS_PoC_UserPlane-V1_0_3-20090922-A (and any subsequent revisions, hereinafter referred to as the OMA PoC TS), which defines the procedures of a Push-to-Talk Over Cellular (PoC) Client (e.g., the UE) and a PoC Server (e.g., the PTT call controller 102). The OMA PoC TS references Session Initiation Protocol (SIP) (for example as described in Internet Engineering Task Force (IETF) Request for Comments (RFC) 3261 dated June 2002, and any subsequent revisions) as an enabling control protocol for requests for initiating and ending media transmissions and other control signaling. Therefore, some aspects of the present teachings are described by reference to protocols and message structures described in the OMA PoC TS. However, the present teachings are not limited to the use of OMA PoC but can be extended to other protocols both standard and proprietary.

The EPC 108 is an all-IP core network that provides mobile core functionality that, in previous mobile generations (2G, 3G), has been realized through two separate sub-domains: circuit-switched (CS) for voice and packet-switched (PS) for data. The EPC 108 enables the above-mentioned all IP end-to-end delivery of media: from mobile handsets and other user equipment with embedded IP capabilities, over IP-based eNodeBs, across the EPC and throughout the application domain, IMS (IP Multimedia Subsystem) and non-IMS.

As mentioned above, The EPC 108 comprises the logical components of the MME 112, the MBMS GW 110, the SGW 114, and the PDN GW 116 and further comprises the, respective, interfaces (also referred to in the art as reference points) between these logical entities. The logical entities of the EPC 108 are shown as separate logical blocks and indeed can, in some embodiments, each be included in separate hardware devices or can, alternatively, be combined in one or more hardware devices. Also, the EPC 108, depending on the size of the network, may have several such components serving thousands or tens of thousands of UE and serving many application servers. Additional known elements and interfaces in an EPC as described in the 3GPP TSs for LTE that are needed for a practical embodiment of the EPC 108 are not shown in FIG. 1 for the sake of clarity.

Turning first to the MME 112, this EPC element is the key control-node for UE access on the LTE system. It is involved in the bearer activation/deactivation process and is also responsible for choosing the SGW for a UE at the initial attach and at time of intra-LTE handover involving Core Network (CN), i.e., MME, SGW, PDN GW, node relocation. The MME 112 is responsible for authenticating the user (by interacting with an HSS, not shown), and the MME 112 is also responsible for generation and allocation of temporary identities or identifiers to UE.

As used herein, the term bearer or bearer resource is defined as a transmission path in a network (such as a RAN) and is used to carry UE data traffic (also termed, herein, as communications or service data flows (SDFs)). An EPS bearer is defined as a bearer that extends between the UE and the PDN GW and encompasses both a wireless path (UE to eNodeB), as well as a network transport path (eNodeB to PDN GW). A bearer can be bidirectional, i.e., having both an uplink path from the UE to the application server and a downlink path from the application server to the UE; or a bearer can be unidirectional, such as a common point-to-multipoint (PTM) downlink path from the application server to the UE for MBMS traffic, which is referred to herein as a MBMS bearer and is defined in the 3GPP TSs for MBMS and is, thus, also referred to herein as a 3GPP MBMS bearer. A MBMS bearer is generally associated with a service (and is therefore also referred to in the art as a MBMS service); and each MBMS bearer is identified using a unique (i.e., different) identifier, which in the 3GPP TSs is called a Temporary Mobile Group Identity (TMGI). Between the eNodeB and the UE, the MBMS bearer takes the form of a Multicast Traffic Channel (MTCH), with the traffic associated to a specific TMGI being carried by a specific MTCH at any given time.

Accordingly, a bearer can be point-to-point (PTP) (such as a unicast bearer), or a PTM bearer (such as a MBMS bearer) and has associated therewith a set of characteristics or attributes including, but not limited to, Quality of Service (QoS), a carrier frequency at which data is modulated, a particular bandwidth, bit rate, etc. A default bearer is defined as a non-GBR (guaranteed bit rate) bearer that provides for "best effort" SDF transmission and is allocated to a UE for the duration of its attachment to the LTE system and need not be explicitly requested. A dedicated bearer is defined as any additional bearer that is established for the same UE and is specifically requested by (or on behalf of) a UE and can be either non-GBR or GBR.

The MBMS GW 110 is an entry point in the LTE system from an application sever via a reference point 104, and it distributes MBMS traffic to all eNodeBs within MBMS service areas. MBMS may use Single Frequency Network (SFN) transmission, also referred to as MBSFN. In MBSFN, or more particularly in a given MBSFN geographic area, the MBMS transmission happens from a time-synchronized set of eNodeBs in the service area, using the same resource blocks. IP multicast can be used for distributing the traffic from the MBMS GW 114 to the different eNodeBs. Moreover, in an embodiment, media is delivered from the LTE EPC (via the MBMS-GW 110) to the eNodeBs in each MBSFN Area of the E-UTRAN 134 using Protocol-Independent Multicast source-specific multicast (PIM-SSM), as illustrated by links 118, 120, 122, and 124.

As described in the 3GPP TSs, a RAN such as the LTE E-UTRAN 134 can be partitioned into one or more MBMS service areas, with each MBMS service area covering a particular geographical area in which MBMS transmissions to the UE can occur. A MBMS service area can be further partitioned into one or more MBSFN Areas each identified by a MBSFN Area ID. Further, each MBSFN Area generally includes a plurality of cells, wherein a cell is defined as being inclusive of a single eNodeB's coverage area or a portion of an eNodeB's coverage area and can be identified by a cell identifier. As used herein, however, the terms "MBMS service area" and "MBSFN area" are used interchangeably since, in the described embodiment, the MBMS service area and MBSFN area have a one-to-one correspondence. However, this is meant only to be illustrative and to provide a simple embodiment for ease of understanding, and is in no way meant to limit the scope of the present teachings. As such, the present teachings also apply to a logical partitioning of the LTE E-UTRAN 134 where there is a one-to-many correspondence between the MBMS service area and MBSFN area.

The SGW 114 routes and forwards user point-to-point data packets, while also acting as the mobility anchor for the user plane during inter-eNodeB handovers and as the anchor for mobility between LTE and other 3GPP technologies. There are also links between the SGW 114 and the eNodeBs for transporting media that are not shown in FIG. 1 for the purpose of simplifying the diagram. The PDN GW 116 provides connectivity to the UE to external packet data networks (PDNs) by being the point of exit and entry of traffic for the UE via a reference point 106. A UE may have simultaneous connectivity with more than one PDN GW for accessing multiple PDNs. The PDN GW 116 performs policy enforcement, packet filtering for each user, charging support, lawful interception and packet screening using policy and charging rules provided by a Policy and Charging Rules Function (PCRF), which is not shown. Another key role of the PDN GW 118 is to act as the anchor for mobility between 3GPP and non-3GPP technologies such as WiMAX and 3GPP2 (CDMA 1X and EvDO).

E-UTRAN 134 comprises multiple cells each served by an eNodeB. As shown in FIG. 1, LTE E-UTRAN 134 includes many eNodeBs (one such eNodeB labeled as 140); each having roughly the same coverage area 136 and that each comprises three cells 138. The eNodeBs serve as the intermediate infrastructure device between the UE and the EPC 108 and a point of access for the UE to assigned or allocated bearers. Each cell represents a geographic coverage area that provides the wireless resources termed herein as bearers for carrying data (or SDFs) for UE connected to the E-UTRAN. Although in this illustrative implementation, each eNodeB coverage area comprises three cells, the number of cells per eNodeB coverage area may be more than three and as few as one.

Furthermore, the LTE EUTRAN 134 comprises a plurality of (in this example four) MBSFN Areas 126, 128, 130, and 132 each having the same number (seven) of eNodeB coverage areas and corresponding number of cells (21). As shown in FIG. 1, the MBSFN areas partially overlay (for example the UE 150 is located in an eNodeB coverage area that is included in MBSFN areas 126 and 128). However, at least some (or all) of the MBSFN areas could have mutually exclusive geographically boundaries.

In accordance with one embodiment of the present disclosure, for example as described by reference below to FIG. 2, an infrastructure device (e.g., the PTT controlled 102) operates to assign pre-established MBMS bearers to transport media to a communication group, wherein a communication group is defined as a group of member devices and/or users that become associated or affiliated with the group for the purposes of receiving one or more common media streams. The common media steams may be any type of media; and where the media distributed is voice, the communication group is referred to as a "talkgroup". Moreover, a media stream is defined as messaging comprising one or more packets that carry media (e.g., voice, data, video, etc.), and a packet is defined in general as a message structure for partitioning the media stream for transmission. However, the message structure of the media does not limit the scope of the teachings herein; as such the teachings can be applied to the transmission of media streams having other message structures.

A plurality of MBMS bearers are established a priori in each MBMS service area (i.e., in each MBSFN area), meaning that the MBMS bearers are "pre-established" or already established before the PTT call controller 102 receives any requests to transmit media over the EPS to a communication group. How the MBMS bearers are established is immaterial, and thus any suitable protocol can be used for bearer establishment depending on the network implementation including, but not limited to, the PTT call controller initiating MBMS Session Start procedures as defined in, for example, 3GPP TS 23.246.

Further in accordance with the embodiment illustrated by reference to FIG. 2, when the PTT call controller 102 receives a request to transmit a media stream to a communication group, the PTT call controller selects a set of MBMS service areas and a different pre-established MBMS bearer in each selected MBMS service area to assign for transmitting the media stream to the communication group. As used herein, a set means one or more. This is very different from what is anticipated by the 3GPP TSs, since according to the present teachings multiple MBMS Bearers identified with different TMGIs are being used to distribute the same media to all members of the talkgroup.

Accordingly, the plurality of MBMS bearers for transporting media streams are established a priori (e.g., system initialization) and held in reservation until time of PTT invocation (via a request for media transmission), wherein one or more of these existing MBMS bearers (identified by TMGIs) within each of the selected MBMS service areas are assigned. In other words, a MBMS bearer is not established exclusively for a specific application service at the time of application invocation (as is done using current MBMS mechanisms); rather MBMS bearers are established a priori and represent a limited set of bandwidth resources for which the PTT call controller assign to talkgroups upon PTT requests. Thus, in this manner, a larger set of talkgroups can then share a lesser number of MBMS bearers by temporarily assigning active talkgroups to available MBMS bearers in the at least one MBMS service areas.

Figure 2:
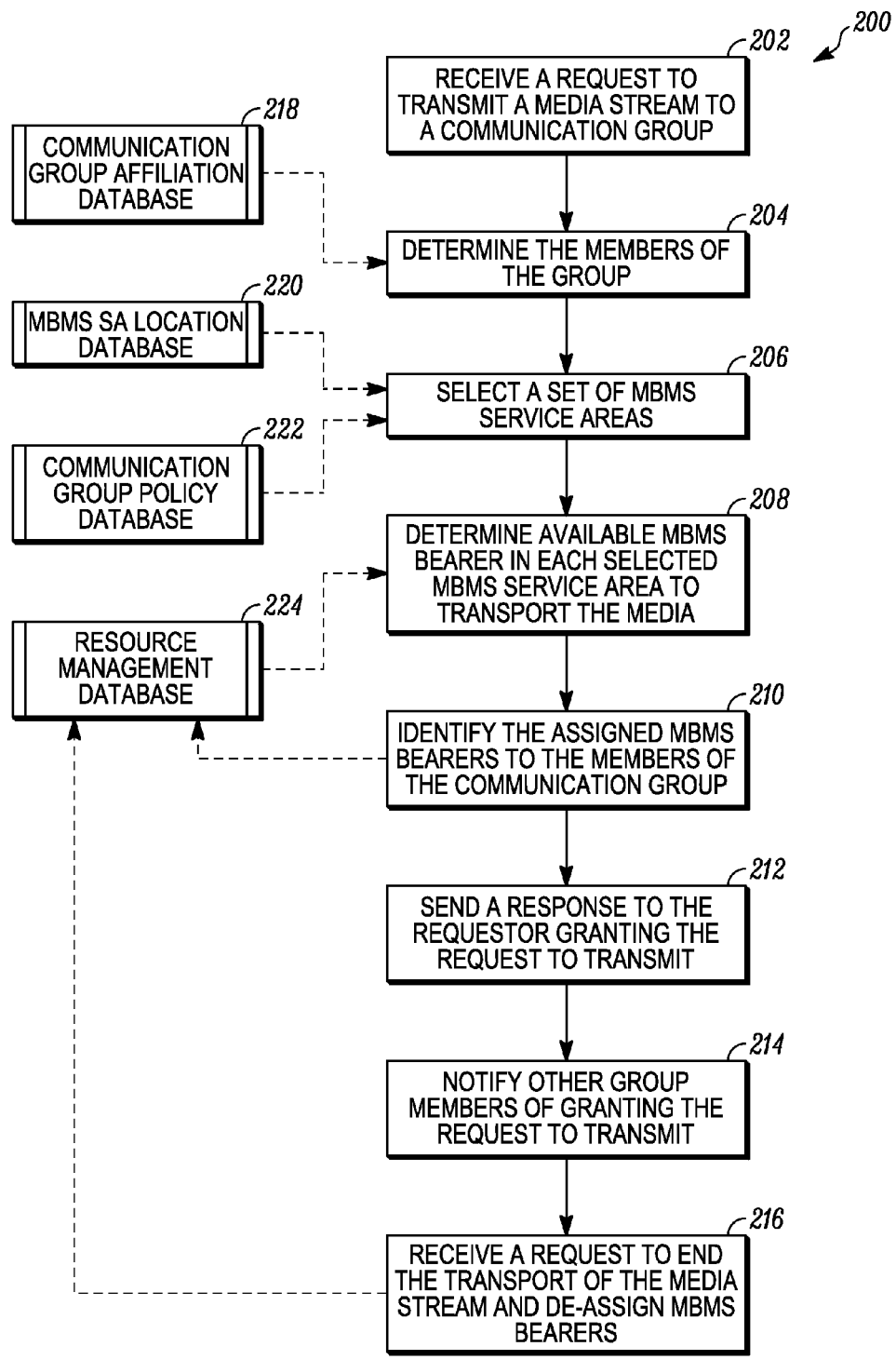
FIG. 2 is a flow diagram illustrating a method performed by an infrastructure device for allocating MBMS bearers in accordance with some embodiments.

Turning now to FIG. 2, a flow diagram illustrating a method for assigning MBMS bearers in a 3GPP compliant system is shown and generally indicated at 200. The functionality illustrated by method 200 is performed in an infrastructure device such as the PTT call controller 102. In accordance with the method 200, at 202, the PTT call controller 102 receives a request to transmit a media stream to a communication group that is identified by a communication group identifier. Let's say, for example, the communication group includes all of the UE shown in FIG. 1. The request can take any suitable message format as determined by the call control protocols being implemented in the system. In this case, wherein OMA PoC is implemented, the request is a PTT request that is communicated by way of floor control signaling, for instance in a Talk Burst Control Protocol (TBCP) message, from a PTT Client affiliated with a particular communication group that is identified by a talkgroup identifier, for instance. However, in an alternative embodiment, the request could be communicated using a SIP INVITE message.

The PTT call controller could select an available pre-established MBMS bearer in every MBMS service area (e.g., 126, 128, 130, 132) of the E-UTRAN 134 to assign to transport the media stream to the communication group. However, this would undoubtedly waste resources since at least some of the times there will not be any members of a given communication group in any of the MBMS service areas to receive the media on the assigned MBMS bearer. For example, for the illustrative communication group having member UE 142 to 162, if the PTT call controller were to "light up" every MBMS service areas or, in other words, assign a MBMS bearer for the media stream in every MBMS service area, there would be two service areas, i.e., MBSFN areas 128 and 132 where bearer resources at least for some portion of time are wasted because no members of the communication group area located in these service areas to receive the media for the communication group.

Therefore, in one embodiment, to conserve limited MBMS bearer resources, the PTT call controller 102 instead performs a procedure so that it intentionally selects those MBMS service areas to light up in which the member UE are located. To this end, the PTT call controller first determines (204) the members of the communication group. For example, a communication group affiliation database 218 is consulted that includes the current members (e.g., users and/or devices identified by any suitable identifier) of numerous communication groups identified by communication group (e.g., talkgroup) identifiers. Database 218 is populated in any suitable manner using both real-time techniques (e.g., the UE reporting its group affiliations during a registration procedure) for dynamically changing group membership and pre-configuration for static group membership. Upon consulting the database 218, the PTT call controller 102 determines that the members of the communication group identified in the PTT request include UE 142 to 162.

The PTT call controller 102 then selects (206) a set of MBMS service areas, wherein the set typically includes those MBMS service areas in which group members are located, in this case service areas 126 and 130 in FIG. 1. In one example implementation, the PTT call controller 102 consults a MBMS service area (SA) location database 220 that maintains information regarding the one or more (if overlapping) MBMS service areas in which each UE in the LTE-UTRAN 134 is located, for example by associating a UE identifier with one or more MBFSN-Area IDs. In this manner, the PTT call controller 102 receives from members of a communication group an indication of the one or more MBMS service areas having a coverage area in which group members are currently located and using these indications to select the set of MSMS service areas in which to assign MBMS bearers for media transmissions for the communication group.

A mechanism used by the UE, in accordance with another aspect of the present disclosure, to populate the MBMS service area location database 220 is described below in detail by reference to FIGS. 3 and 4. Upon consulting the database 220, the PTT call controller 102 determines that the members' devices 142 to 162 of the communication group identified in the PTT request are located in the MBMS services areas 126 and 130 having, respective, identifiers MBSFN-AreaID 1 and MBSFN-AreaID N.

The PTT call control 102 may also include (206) other MBMS service areas in the set based on a policy determination. For instance, using input from a communication group policy database 222, the PTT call controller 102 determines other "critical" MBMS service areas to include in the set including, but not limited to, MBMS service areas that: provide coverage of a high crime area; provide coverage of a high use area (e.g., near a police station or other busy area); are adjacent to MBMS service areas where group members are located to make mobility transitions better; provide coverage where priority users such as commanders may be located; etc.

After determining the set of MBMS services areas, the PTT call controller 102 identifies (208) one or more available pre-established MBMS bearers in each of the selected MBMS services areas to assign to transport the media stream for the communication group. In one illustrative implementation, the PTT call controller 102 consults a resource management database 224 that at a minimum contains a listing of all of the pre-established MBMS bearers in each MBMS service area and a simple indication of current communication group assignment status for each of the MBMS bearers, for example assigned or available (unassigned). However, to further support certain messages (e.g., MBMS connect and disconnect messages) generated by the PTT call controller in accordance with other aspects of the present disclosure, the resource management database 224 further maintains for each assigned MBMS bearer, an identification of the communication group to which the MBMS bearer is assigned. Database 224 can be populated at least in part by the PTT call controller 102 as it assigns and de-assigns the pre-established MBMS bearers. The database 224 can also be populated at least in part using information from the LTE-EUTRAN (or other applications that monitor such information) when MBMS bearers are available, for example if new MBMS bearers are added (or removed) from the listing of pre-established MBMS bearers for a given MBMS service area.

At 210, the PTT all controller 102 identifies the assigned MBMS bearers to the members of the communication group, by sending to the members a TMGI for each assigned MBMS bearer, to "bind" these MBMS bearers to this group. The MBMS bearer binding can be communicated to the group members using any suitable signaling or messaging, for instance using a MBMS connect message in accordance with another aspect of the present disclosure, as described later in further detail. Alternatively, although in some instances not as efficient and limiting in the amount of data that can be put into the messages, the MBMS bearer binding could be included in floor control signaling, at 212 and 214 respectively, to the PTT Client sending the PTT request (i.e., the PTT requestor) and to the other group members notifying the corresponding UE (and users) that a session is granted in response to the PTT request. For example, the floor control signaling comprises a Call Grant message to the PTT requestor and a Call Taken message to the other group members, as described in OMA-TS-PoC_UserPlane-V1_0-3-20090922-A.

In addition, upon assigning the MBMS bearers to the communication group, the PTT call controller 102 updates the resource management database 224 and receives and forwards the media stream to the group members over the assigned MBMS bearers. Forwarding entails replicating the media stream and delivering it to the MBMS Service areas (for example, MBSFNs 126 and 130) by transmitting the replicated media to the IP Multicast addresses corresponding to the assigned MBMS bearers (identified by TMGIs). The members of the communication group use the TMGIs provided by the PTT call controller 102 to access the assigned MBMS bearers and receive the media stream being broadcast to the communication group on those MBMS bearers.

At 216, the PTT call controller 102 receives a request to end the transport of the media stream for the communication group. For example, the request comprises a TBCP Release message as defined in the OMA PoC TS, or the request to end the transport of the media stream may be implied by the expiration of a hang timer. In response thereto, the PTT call controller 102 de-assigns the MBMS bearers that were assigned to the communication group and updates the resource management database 224. The PTT call controller communicates the MBMS bearer de-assignments to the group members to "unbind" the MBMS bearers from the communication group so that they can be returned to the pool of available pre-established MBMS bearers and assigned in response to a subsequent PTT request either by this current communication group or likely a different communication group altogether.

Figure 3:
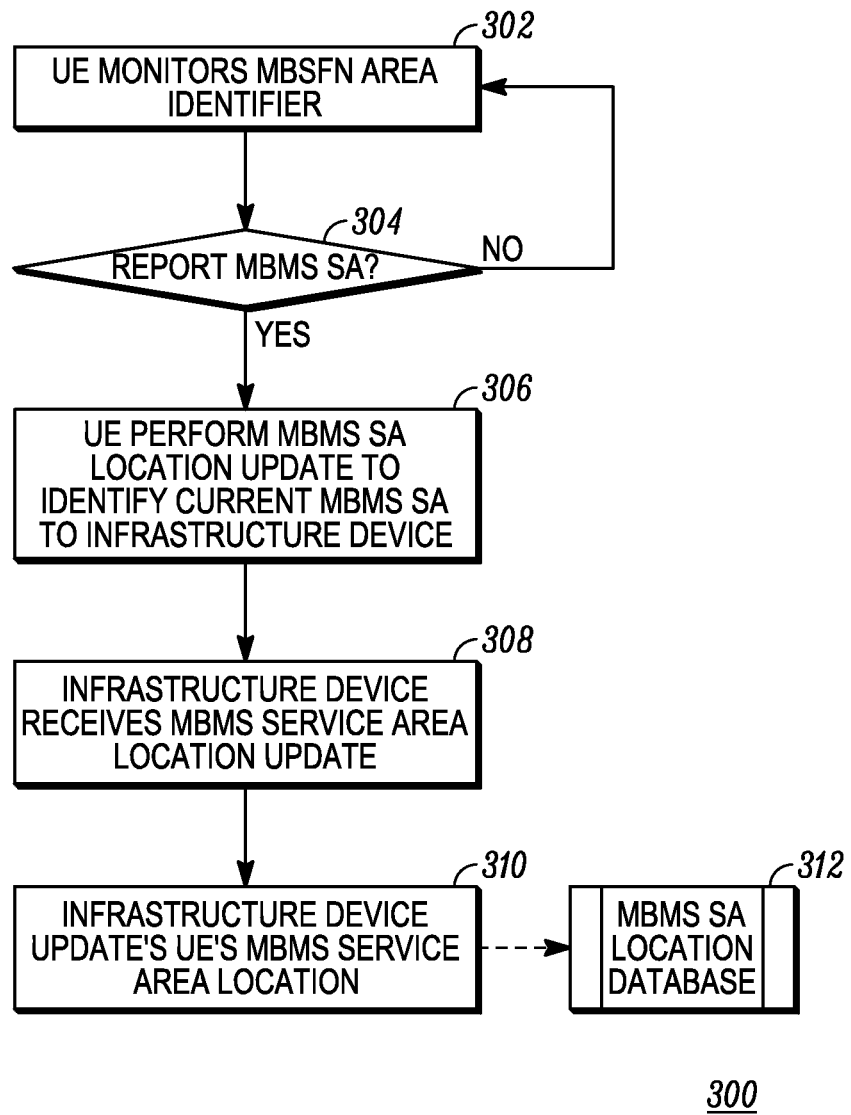
FIG. 3 is a flow diagram illustrating a method performed in a UE for MBMS Service Area location update in accordance with some embodiments.

Turning again to the population of the MBMS service area location database 220, FIG. 3 illustrates a method 300 performed by a UE to populate database 220. In short, the UE determines one or more MBMS service areas in which the UE is currently located and then identifies each MBMS service area to the PTT call controller 102 by sending one or more MBMS service area ID (e.g., MBSFN-Area ID). Method 300 details one example algorithm that the UE can perform to provide this MBMS service area location update.

More particularly, at 302, the UE monitors the MBSFN Area ID for the MBMS service area in which the UE is located. In one example implementation, the MBSFN-AreaID is transmitted periodically over a 3GPP layer 2 System Information Block (SIB), and monitored by the UE. For instance, the eNodeB periodically sends the MBSFN-AreaID for the MBMS service area in SIB 13. The UE determines (304) whether it needs to report the MBSFN-AreaID to the PTT call controller based on whether there has been a change in MBSFN-AreaID, movement to a geographic area that does not support MBMS (e.g., a "NULL" area), or an initial MBSFN-AreaID (e.g., at power-up or movement from an area with no MBMS coverage to an area with MBMS coverage or movement between different MBMS service areas). If there is no need to report the MBSFN-AreaID, the UE continues monitoring the MBSFN-AreaID for its current location.

Upon detection of a MBSFN-AreaID reporting event, the UE performs (306) a MBMS service area location update to identify its current one or more MBMS service areas to the PTT call controller 102. More particularly, the UE transmits the MBSFN-AreaID to the PTT call controller 102 in a message called the "MBSFN-AreaID Update" message, which can take any suitable form depending on the protocols used in the communication system. Upon receiving (308) the MBMS service area location update, the PTT call controller 102 updates (310) the UE's MBMS service area location by storing the received information in the MBMS location database 312, and if necessary deleting any stale or outdated location information for this UE.

As mentioned above, this information is used by the PTT call controller 102 to determine the one or more MBMS service areas in which group members are located. The PTT call controller can, thereby, limit downlink PTT broadcast to those MBSFNs that have group members. Moreover, the PTT call controller 102 can use the knowledge of group member locations (relative to a MBMS service area) to select areas of broadcast and to estimate or predict subsequent MBSFN areas of group distribution (e.g. in preparation for handoffs).

Figure 4:
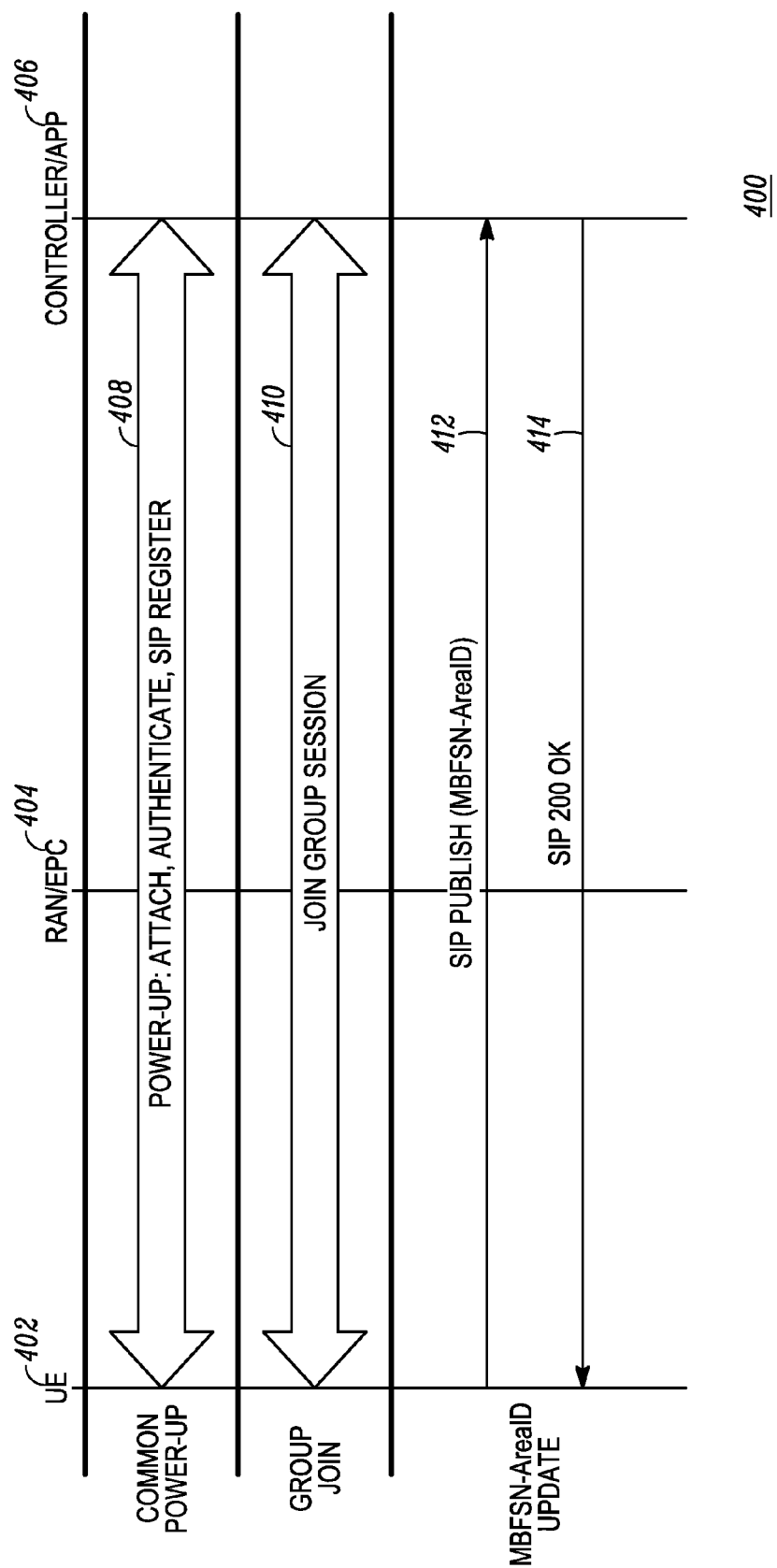
FIG. 4 is a message sequence chart illustrating a method performed in a UE for MBMS Service Area location update in accordance with some embodiments.

FIG. 4 illustrates one example embodiment of a MBSFN-AreaID Update procedure. More particularly, FIG. 4 shows a message sequence chart (MSC) 400 illustrating messaging between a UE 402 and a controller/application 406 (e.g., the PTT call controller 102) over a RAN/EPC 404 (e.g., the LTE-EUTRAN 134/LTE EPC 108). In accordance with this embodiment, the UE transmits the MBSFN-AreaID Update message within a SIP PUBLISH to the PTT call controller 102. The message is transmitted by the UE whenever it detects a MBSFN-AreaID reporting event as described herein.

As specifically shown in MSC 400, the UE 402 powers up, at 408, wherein the UE attaches to the LTE network, authenticates, and performs a registration process (e.g., a SIP REGISTER procedure), for example, in compliance with the OMA PoC TS. The UE joins a group session 410 using signaling described in the OMA PoC TS, e.g., using a SIP INVITE. Once connected, registered, and authorized to use the system, the UE detects the MBSFN-AreaID of the MBMS service area in which it is located; and since this is a reporting event (i.e., power-up), the UE 402 transmits a SIP PUBLISH message containing the MBSFN-AreaID, at 412, to the controller/application 406. At 414, the controller/application responds with a unicast SIP 200 OK message. In an alternative implementation, the order of the group joining procedure and the MBSFN-Area ID update procedure can be reversed.

UE power-up is one event in which the UE performs a MBMS service area location update. Another event is if there is a change in MBMS service area from one service area to another service area. The UE reports one MBSFN-AreaID if it is located in only one MBMS service area (e.g., as indicated by the transmission on the SIB 13). However, if the UE is located in multiple overlapping MBMS service areas, it will detect on the SIB 13 and transmit to the controller/application all of the MBSFN-AreaIDs corresponding to the MBMS service areas in which it is currently located; the detecting of multiple MBSFN-AreaIDs can arise for instance on power-up or when the UE moves from one MBMS service area to an area having overlapping MBMS service areas. In addition, if the UE powers-up or moves to a geographic area that does not support MBMS, the UE can report a "NULL MBSFN" using a known value or bit sequence to inform the controller/application that the UE is no longer reachable via MBMS.

An alternative embodiment is to send the MBSFN-AreaID Update message to a presence agent (or similar function), for example using a SIP PUBLISH. Accordingly, interested watcher applications (e.g. the PTT call controller 102) could SUBSCRIBE with the presence agent for notifications (NOTIFY) of MBSFN-AreaID updates.

Figure 5:
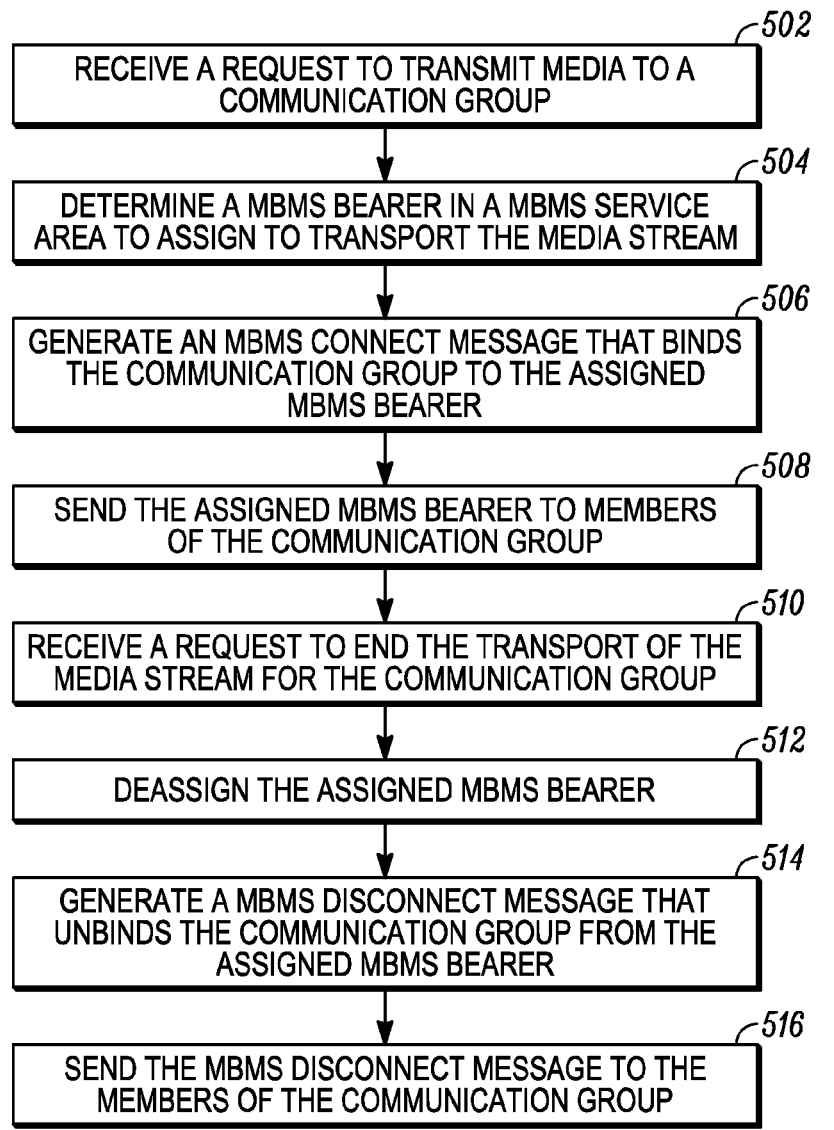
FIG. 5 is a flow diagram illustrating a method binding and unbinding a MBMS bearer to a communication group in accordance with some embodiments.

As described above, by reference to FIG. 2, block 214, once the PTT call controller 102 assigns one or more MBMS bearers to transport the media stream from the communication group, the PTT call controller notifies at least one member of the communication group of the MBMS bearer assignments. More particularly, those members that are located within one or more given MBMS service area are notified of the assigned MBMS bearer for each of the MBMS service areas in which they are located. FIGS. 5-7 illustrate methods, in accordance with the teachings herein, for binding and unbinding pre-established MBMS bearers to a particular communication group, wherein part of this process is notifying one or more group members of the binding (e.g. bearer assignment) and unbinding (e.g., bearer de-assigning) events.

Turning first to FIG. 5, a flow diagram is shown illustrating a method performed by the PTT call controller 102 for binding and unbinding a pre-established MBMS bearer to a communication group. It should be noted that for purposes of clarity and ease of description, method 500 is explained in relation to the binding of a single MBMS bearer to a communication group in a single MBMS service area. However, the principles and teachings with respect to method 500 are equally applicable in the case of the PTT call controller 102 assigning and binding multiple MBMS bearers to the same communication group in the same or additional MBMS areas; in that case, at least portions of the method are performed multiple times.

In accordance with method 500, the PTT call controller 102 receives (502) a request to transmit a media stream to a communication group and determines (504) a MBMS bearer in one or more selected MBMS service areas to assign to transport the media stream. Function 502 and 504 are performed as described above by reference to functions 204, 206, and 208 (of FIG. 2), the description of which is not repeated here (accordingly, the PTT call controller might assign multiple MBMS bearers from multiple MBMS service areas). For each selected MBMS service area, the PTT call controller 102 generates (506) a "MBMS connect message" (also referred to herein as a "MBMS binding message") that binds the communication group to the corresponding assigned MBMS bearer for that MBMS service area. The PTT call controller 102 then sends (508) the MBMS connect message to the corresponding MBMS service area to communicate with or otherwise notify members of the communication group located in that MBMS service area of the assigned MBMS bearer for that MBMS service area.

The MBMS binding messages connect (bind) or disconnect (unbind) a communication group to a MBMS bearer. Thus message "MBMS Connect" binds a group to a MBMS bearer within a given MBMS Service area; and the companion message "MBMS Disconnect" unbinds a group and a MBMS bearer. More particularly, after receiving the PTT message, the PTT call controller 102 generates a specific MBMS Connect message that includes at least an identifier for the communication group and an identifier for an assigned MBMS bearer for a given MBMS service area for the purpose of binding the communication group (via the communication group identifier) to the assigned MBMS bearer (via the MBMS bearer identifier). In the present example system 100 implementation, for example, the MBMS connect message includes at least a talkgroup identifier and the TMGI for the assigned bearer, which essentially enables the PTT call controller to announce the TMGI assigned to the talkgroup for that particular MBMS service area. In addition, the MBMS message identifies an address for accessing the media stream on the assigned MBMS bearer, for instance an Internet Protocol (IP) multicast address.

The MBMS connect message can be sent either point-to-point (i.e., over a set of one or more unicast bearers) or using a point-to-multipoint bearer, such as a MBMS bearer that is pre-established and used for sending MBMS connect and disconnect messages and perhaps other control messages. Moreover, any suitable message format can be used such as a SIP message, or the MBMS connect and disconnect messages can be included within non-SIP message like a floor control message, which in one example implementation is a TBCP message. Moreover, the MBMS binding message (i.e., MBMS connect message and MBMS disconnect message) is flexible in that, depending on the particular embodiment being employed, it can carry a single binding (e.g., carried on a unicast bearer for a particular group member) or multiple bindings (e.g., referred to as a listing or table, etc. and carried on a dedicated pre-established MBMS bearer) for a given MBMS service area.

An example of the contents 600 within a MBMS Connect (or Disconnect) message is illustrated by reference to FIG. 6. As described, the contents 600 include a portion or field 602 for a TMGI value or number identifying the assigned MBMS bearer; a portion or field 604 for the IP Multicast address to access the MBMS bearer; and a communication group identifier (e.g., a talkgroup identifier) identifying the communication group. However, it may not always be desirable to send these messages using unicast Therefore, a second embodiment is disclosed wherein multiple bindings (via multiple MBMS bearer identifiers) for a plurality of communication groups is included a single MBMS connect message. This particular embodiment of MBMS connect (or disconnect) message is sent at PTT invocation or can be sent periodically, for instance, as a table that continuously announces at least some portion of all MBMS bearer identifiers within a particular MBMS service area and their current communication group assignments or usage status. In an embodiment, the MBMS connect (or disconnect) identifies only the MBMS bearers for the talkgroups in the MBMS service area. The indication of the current communication group assignments or usage status can take a number of forms including, but not limited to: known values that simply indicate whether the corresponding MBMS bearer is assigned or unassigned An example of a listing 700 of MBMS bindings, in the form of a table, is shown in FIG. 7. Table 700 includes a column 702 having TMGI for multiple MBMS bearers in a particular MBMS service area, a column 704 having IP Multicast addresses corresponding to (in the same row as) the TMGI, and optionally a column 706 having talkgroup assignments corresponding to (in the same row as) the TMGI. An advantage of the second embodiment is that the information contained therein is of a constant size and is, thus, more easily scheduled on a dedicated pre-established MBMS bearer (i.e., a MBMS broadcast channel) if sent at a periodic rate, for instance every N msec). In this way, the MBMS connect (or disconnect) message having content as illustrated, for example, in FIG. 7 is sent to all group members (of a plurality of communication groups) that are located in a particular MBMS service area and communicates that particular MBMS bearers in that service area have been bound or unbound to particular communication groups.

Returning again to method 500 shown in FIG. 5, the PTT call controller 102 receives (510) a request to end the transport of the media stream for the communication group. For example, the request comprises a TBCP Release message as defined in the OMA PoC TS, or the request to end the transport of the media stream may be implied by the expiration of a hang timer. Responsive to the request, the PTT call controller de-assigns (512) the assigned MBMS bearer and generates (514) a disconnect message that unbinds the communication group from the MBMS bearer and sends (516) the MBMS disconnect message to the MBMS service area to communicate the disconnect message to at least one member of the communication group that is located in the service area.

The MBMS disconnect message includes an identifier for the de-assigned MBMS bearer and an indication that the de-assigned MBMS bearer is no longer used for transporting the media for the communication group. The indication that the MBMS bearers is no longer assigned can, in one implementation, comprise a known NULL indication, and in another implementation comprise an identifier for a different communication group. Further, the MBMS disconnect message can be sent on a set of unicast bearers or a point-to-multipoint bearer and can have a format such as that shown in FIGS. 6 and 7, as described above. Optionally the MBMS disconnect message may be sent on a bearer assigned or allocated to transport the media for the communication group, such as a unicast bearer or a pre-established MBMS bearers temporarily assigned to broadcast the media.

Although there is some advantage to communicating multiple MBMS bearer assignments (e.g., as shown in FIG. 7) simultaneously, and there is also at least one disadvantage. Namely, the overhead of the binding and unbinding messages can become excessive, thus utilizing resources that otherwise could have been used for media. Another embodiment defines an optimization to the binding and unbinding messages and procedures that results in both a defined size of signaling (making the messages easier to schedule) and a minimal overhead (allowing more RF resources to be allocated for media distribution). In accordance with this embodiment, the MBMS connect and disconnect message is broken into two portions sent in different messages, termed herein an "initial" message and a "follow-up" message.

The initial message comprises a listing (e.g., a table) of multiple MBMS bearer identifiers and optionally current communication group assignments, such as the table shown in FIG. 7. In accordance with this embodiment, the table 700 is included in a response message to a UE, which is responsive to a MBMS service area location update message sent to the PTT call controller by the UE. The details of the MBMS service area location procedure, including the timing of the MBMS service area location update messages (e.g., at power-up, change in MBMS service area, etc.), is described in detail above by reference to FIGS. 3 and 4 and will not be repeated here.

The follow-up message is much smaller in size than the initial message, which includes a listing (table) a communication group (talkgroup) identifiers, and can be sent at PTT invocation and/or periodically (e.g., frequent enough to enable late entry to a call and robustness), using any of the signaling techniques described above. For example, the table is unicast or is transmitted continuously (e.g. every 80 msec)

on a pre-established downlink broadcast MBMS bearer that UE monitor to determine if an interested group has gone active, and if so, which TMGI (MBMS bearer) the group has been assigned. Because this table is repeated frequently to minimize call set-up time and to minimize late entry user delays, it's important that the message be kept minimal.

In an embodiment, the table in the initial message has an established or pre-defined order of the MBMS bearer IDs (TMGIs), which changes infrequently. The order of this first table can be leveraged to decrease the size of the table sent in the follow-up message. More particularly, because UE learn the particular order of MBMS bearer list, the only information required within the connect or disconnect message is the list of communication group identifiers arranged in order of the TMGIs, essentially column 706 from FIG. 7. Thus, the talkgroup identifiers of the table in the follow-up message are listed in the order of the TMGIs presented in column 702, with the TMGI/talkgroup ID binding occurring in the same row number within both tables. Moreover, the table in the initial message and the table in the follow-up message for a given assigned MBMS bearer are paired, and there is a pairing of these two tables for each MBMS bearer assigned to a support communication group.

When a communication group becomes active and a MBMS bearer is assigned, the assignment is communicated by setting a row in the table of the follow-up message to the assigned group identifier, wherein the row that is set corresponds to the same row in the table of the initial message as contains the TMGI of the assigned MBMS bearer. When a media stream terminates, the corresponding entry is set to an unassigned (NULL) value, e.g. all 1's or all 0's or to the ID of another group if one has been assigned. In addition, both tables can include a version number for cases in which the table in the initial message changes. This allows synchronization of the table information. In an alternate embodiment, the table sent in the follow-up message can be modified to include both the TMGI and the talkgroup assignments, but only for active groups. This results in a smaller message for relatively lightly loaded systems. For heavily loaded systems, however, where most of the TMGIs are always in use the single-column approach is more efficient.

In one illustrative implementation, the second table (i.e., of the follow-up message) is sent every 60 or 80 msec on a MBMS bearer allocated for application control/signaling, and this table is maintained by the PTT call controller 102 and updated as calls/groups are bound/unbound to the MBMS bearers and scheduled for broadcast, just like any other broadcast packet. Moreover, ideally the second table (i.e., in the follow-up message) is broadcasted on a MBMS bearer that is scheduled (in time) before the media bearers it's advertising. In a further implementation, a separate MBMS bearer is created for the broadcast of the second table.

Figure 8:
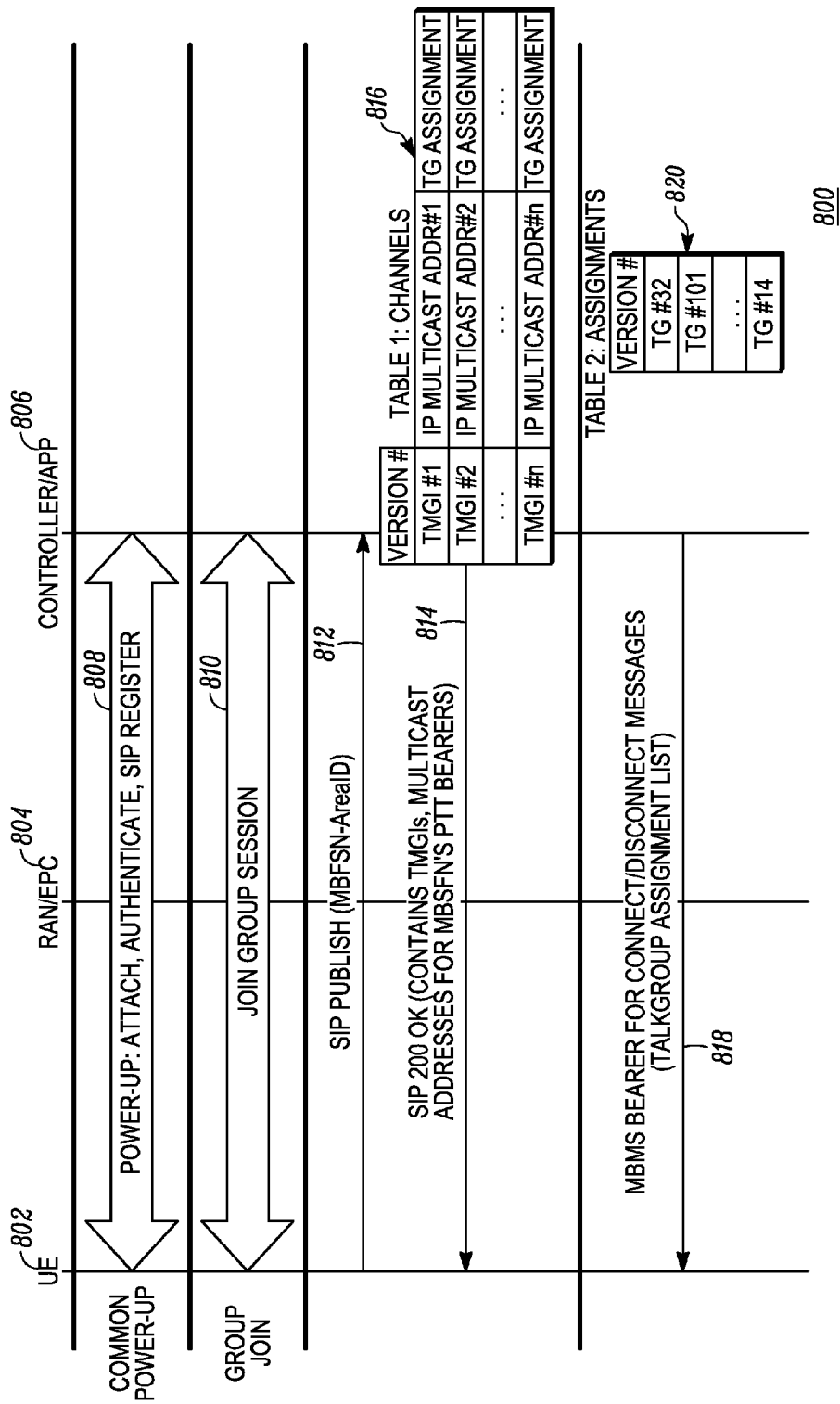
FIG. 8 is a message sequence chart illustrating a method performed in a an infrastructure device for binding and unbinding a MBMS bearer to a communication group in accordance with some embodiments.

FIG. 8 shows a MSC 800 that illustrates the signaling between a UE 802, a RAN/EPC 804, and a Controller/Application 806 in accordance with the embodiment wherein the MBMS connection and disconnection messages comprise the initial and follow-up messages or portions as described above. As specifically shown in MSC 800, the UE 802 powers up, at 808, wherein the UE attaches to the LTE network, authenticates, and performs a registration process (e.g., a SIP REGISTER procedure), for example, in compliance with the OMA PoC TS. The UE joins a group session (810) using signaling described in the OMA PoC TS, e.g., using a SIP INVITE.

Once connected, registered, and authorized to the system, the UE detects the MBSFN-AreaID of the MBMS service area in which it is located; and when there is a reporting event, the UE 802 transmits a SIP PUBLISH message containing the MBSFN-AreaID, at 812, to the controller/application 806. At 814, the controller/application 806 responds with a SIP 200 OK message. The message sent as 814 is used as the initial message to send a first table 816 (as described above). Table 816 can also be provided to the UE through other techniques such as using a standalone SIP NOTIFY method. The controller/application 806 sends a second table 820 in a followup message 818 on a pre-established MBMS bearer, for example, for sending connect and disconnect messages (as described above).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for allocating Multimedia MBMS bearers in a 3GPP compliant system as described herein. The non-processor circuits may include, but are not limited to, a radio receiver, a radio transmitter, signal drivers, clock circuits, power source circuits, and user input devices. As such, these functions may be interpreted as steps of a method to perform the allocating of Multimedia MBMS bearers in a 3GPP compliant system as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for binding and unbinding a Multimedia Broadcast/Multicast Service (MBMS) bearer to a communication group in a $3^{rd}$ Generation Partnership Project (3GPP) compliant system, the method comprising:
an infrastructure device coupled to the 3GPP compliant system, the 3GPP compliant system having a radio access network partitioned into a plurality MBMS services areas, wherein each MBMS service area has a plurality of MBMS bearers established a priori for transporting media streams, the infrastructure device performing:
receiving a request to transmit a media stream to a communication group, wherein the request to transmit is received after the MBMS bearers were established;
determining a MBMS bearer of the plurality of MBMS bearers established a priori for transporting media streams in a MBMS service area of the plurality MBMS services areas to assign to transport the media stream;
generating a MBMS connect message that binds the communication group to the assigned MBMS bearer, wherein the MBMS connect message includes an identifier for the communication group and an identifier for the assigned MBMS bearer;
sending the MBMS connect message to members of the communication group.

2. The method of claim 1, wherein the MBMS connect message comprises a non-Session Initiation Protocol message.

3. The method of claim 1, wherein the identifier of the assigned MBMS bearer comprises a Temporary Mobile Group Identifier and an Internet Protocol Multicast address.

4. The method of claim 1, wherein the MBMS connect message is sent over a set of point-to-point bearers.

5. The method of claim 1, wherein the MBMS connect message is sent over a point-to-multipoint bearer.

6. The method of claim 5, wherein the point-to-multipoint bearer on which the MBMS connect message is sent comprises a MBMS bearer that was established before the request to transmit was received by the infrastructure device and that is used for sending MBMS connect messages.

7. The method of claim 1, wherein the MBMS connect message includes an identifier for another MBMS bearer in the MBMS service area and a corresponding indication of a current communication group assignment status for the other MBMS bearer.

8. The method of claim 1 further comprising:
the infrastructure device performing:
receiving a request to end the transport of the media stream for the communication group;
de-assigning the assigned MBMS bearer;
generating a MBMS disconnect message that unbinds the communication group from the assigned MBMS bearer, wherein the MBMS disconnect message includes an identifier for the de-assigned MBMS bearer and an indication that the de-assigned MBMS bearer is no longer used for transporting the media for the communication group;
sending the MBMS disconnect messages to the members of the communication group.

9. The method of claim 8, wherein the indication that the MBMS bearer is no longer assigned comprises a known NULL indication.

10. The method of claim 8, wherein the indication that the MBMS bearer is no longer assigned comprises an identifier for a different communication group.

11. The method of claim 1, wherein the identifier for the communication group comprises a talkgroup identifier.

12. A Push-to-Talk (PTT) controller capable of operating in a 3GPP compliant system having a radio access network partitioned into a plurality MBMS services areas, wherein each MBMS service area has a plurality of MBMS bearers established a priori for transporting media streams, the PTT controller comprising:
a processing device; and
non-transitory memory comprising instructions that, when executed by the processing device, perform the following functions:
receive a request to transmit a media stream to a communication group, wherein the request to transmit is received after the plurality of MBMS bearers were established;

determine a MBMS bearer of the plurality of MBMS bearers established a priori for transporting media streams in a MBMS service area of the plurality MBMS services areas to assign to transport the media stream;
generate a MBMS connect message that binds the communication group to the assigned MBMS bearer, wherein the MBMS connect message includes an identifier for the communication group and an identifier for the assigned MBMS bearer;
send the MBMS connect message to members of the communication group.

\* \* \* \* \*

UNITED STATES PATENT AND TRADEMARK OFFICE
CERTIFICATE OF CORRECTION

Page 1 of 2

PATENT NO. : 8,861,419 B2
APPLICATION NO. : 12/981274
DATED : October 14, 2014
INVENTOR(S) : Michael F. Korus et al.

It is certified that error appears in the above-identified patent and that said Letters Patent is hereby corrected as shown below:

IN THE TITLE PAGE:

Page 2, item (56), under "OTHER PUBLICATIONS," in Column 2, Line 35, delete "Netowrks,"" and insert -- Networks," --, therefor.

Page 2, item (56), under "OTHER PUBLICATIONS," in Column 2, Line 50, delete "Reasearch" and insert -- Research --, therefor.

IN THE DRAWINGS:

In FIG. 4, Sheet 4 of 7, delete "(MBFSN-AreaID)" and insert -- (MBSFN-AreaID) --, therefor.

In FIG. 4, Sheet 4 of 7, delete "MBFSN-AreaID" and insert -- MBSFN-AreaID --, therefor.

In FIG. 8, Sheet 7 of 7, delete "(MBFSN-AreaID)" and insert -- (MBSFN-AreaID) --, therefor.

IN THE SPECIFICATION:

In Column 2, Line 35, delete "a an" and insert -- an --, therefor.

In Column 3, Line 31, delete "(having" and insert -- having --, therefor.

In Column 6, Line 18, delete "sever" and insert -- server --, therefor.

In Column 9, Line 18, delete "MBFSN-Area IDs." and insert -- MBSFN- AreaIDs. --, therefor.

In Column 9, Line 22, delete "MSMS" and insert -- MBMS --, therefor.

In Column 13, Line 39, delete "unicast" and insert -- unicast. --, therefor.

Signed and Sealed this
Seventeenth Day of May, 2016

Michelle K. Lee
*Director of the United States Patent and Trademark Office*

CERTIFICATE OF CORRECTION (continued)
U.S. Pat. No. 8,861,419 B2

In Column 13, Line 55, delete "unassigned" and insert -- unassigned. --, therefor.

In Column 13, Line 67, delete "msec)." and insert -- msec. --, therefor.